US007297938B2

(12) United States Patent
Fauci et al.

(10) Patent No.: US 7,297,938 B2
(45) Date of Patent: Nov. 20, 2007

(54) INTEGRATED BLACK BODY AND LENS CAP ASSEMBLY AND METHODS FOR CALIBRATION OF INFRARED CAMERAS USING SAME

(75) Inventors: Mark A. Fauci, Patchogue, NY (US); Matthew A. Salvitti, Patchogue, NY (US); Marek Pawlowski, Glen Cove, NY (US)

(73) Assignee: Advanced BioPhotonics, Inc., Bohemia, NY (US)

( * ) Notice: Subject to any disclaimer, the term of this patent is extended or adjusted under 35 U.S.C. 154(b) by 0 days.

(21) Appl. No.: 11/085,860

(22) Filed: Mar. 22, 2005

(65) Prior Publication Data

US 2005/0205773 A1 Sep. 22, 2005

Related U.S. Application Data

(60) Provisional application No. 60/555,196, filed on Mar. 22, 2004.

(51) Int. Cl.
*G01D 18/00* (2006.01)
*G12B 13/00* (2006.01)
*G03B 17/00* (2006.01)

(52) U.S. Cl. ........................ 250/252.1; 374/2; 396/448

(58) Field of Classification Search .................... 374/2; 396/448
See application file for complete search history.

(56) References Cited

U.S. PATENT DOCUMENTS 5,466,943 A * 11/1995 Green et al. ............. 250/493.1
5,602,389 A * 2/1997 Kato et al. ............... 250/252.1
5,994,701 A * 11/1999 Tsuchimoto et al. ........ 250/351
6,086,245 A * 7/2000 Yam ............................. 374/2
6,247,855 B1 * 6/2001 Motohashi et al. ......... 396/448
6,875,979 B2 * 4/2005 Cope ....................... 250/252.1
6,929,410 B2 * 8/2005 Nguyen et al. ............. 396/463

* cited by examiner

*Primary Examiner*—David Porta
*Assistant Examiner*—Mark R Gaworecki
(74) *Attorney, Agent, or Firm*—Mayer & Williams PC; Karin L. Williams, Esq.

(57) ABSTRACT

A black body assembly is provided for use in the calibration of infrared cameras. The assembly includes, among other things, a housing within which calibration components may be situated, and a lens guide for accurately positioning the assembly over a lens of the infrared camera. A heat emitter may be positioned within the housing for emitting a necessary amount of heat for calibration purposes. A heating element may also be provided within the housing for controlling the heating and cooling of the heat emitter. The assembly may also include a heat sink to remove excessive heat generated from the thermoelectric cooler during temperature cycling. An arm may be employed to hingedly connect the assembly to the camera to provide reliable and repeatable way to position the black body assembly at the front of the infrared lens. A method for calibrating an infrared camera is also provided.

38 Claims, 4 Drawing Sheets

INTEGRATED BLACK BODY AND LENS CAP ASSEMBLY AND METHODS FOR CALIBRATION OF INFRARED CAMERAS USING SAME

RELATED U.S. APPLICATIONS

The present application claims priority to U.S. Application Ser. No. 60/555,196, filed Mar. 22, 2004, which application is hereby incorporated herein by reference.

TECHNICAL FIELD

The present invention relates to a black body and more particularly, an integrated black body and lens cap assembly for use in the calibration of infrared cameras requiring temperature calibration.

BACKGROUND ART

Infrared cameras are currently being used, among other things, to detect slight temperature differences within an object or body being monitored that may be situated at some distance from the infrared sensors or detectors within these cameras. The ability to measure slight temperature differences may be based on the sensitivity of the detectors to the emission of infrared radiation from the body being monitored. In order for an infrared detector to quantify a temperature reading or difference, it is typically calibrated using a source of blackbody radiation, otherwise known as a blackbody.

Apparatus and methods for calibrating infrared detectors are well-known. An infrared blackbody radiates thermal energy in the wavelength ranges of infrared radiation. The ideal blackbody absorbs radiation at all frequencies, and only emits radiation in the target frequency. When calibrating an infrared camera or a similar device that includes an infrared detector, a black body assembly may be positioned at an objective plane (i.e., lens) of the camera. A number of blackbody assemblies available on the market today are effectively a black body positioned within a box having an opening at one end. The lens of the camera to be calibrated may be pointed into this box. However, calibration results can vary based on changes in the positioning of the lens inside the box.

During calibration, infrared flux from the blackbody is permitted to radiate toward the lens through apertures in the blackbody. The magnitude of the infrared flux emitted over unit time by the blackbody is directly proportional to the temperature of a heat emitter within the blackbody assembly. The heat emitter often may be made of a thermally conductive material, such as copper or aluminum, to ensure uniform diffusion of heat across its surface for uniform radiation of infrared photons over its surface area. The larger the heat emitter is in size, the more difficult it is to ensure that each point across the heat emitter is at the same temperature. The temperature of the heat emitter of the blackbody assembly may be regulated by a heating/cooling source, for instance, a thermoelectric cooler (TEC), whose temperature is electronically controlled by a temperature controller, such that the temperature of the heat source can be varied from cooler than the heat emitter to warmer than the heat emitter.

To ensure that the heat emitter is heated or cooled to the correct temperature, a temperature sensing element may be positioned on the surface or inside the heat emitter itself. The output of this sensing element is typically connected back to the temperature controller to complete the temperature regulation loop. The temperature controller will regulate the current sent to the TEC to achieve and maintain the desired temperature level of the heat emitter. A heat sink may be included adjacent the TEC to help remove the heat when the heat emitter has to be cooled below its present temperature. A fan may also be included near the heat sink to speed the process of heat removal when required.

While there are a number of black body assemblies commercially available, these black body assemblies are often bulky and heavy due to the magnitude and range of temperatures that must be reached. For calibration, the camera and the blackbody assembly must be brought together. The relocation of either the camera or the black body assembly may be difficult or even impractical. For example, in an operating room in a hospital where the infrared camera may be mounted to a ceiling suspended arm, it may be inconvenient or even impractical to relocate a bulky black body assembly to the location of the camera for calibration.

Accordingly, it is desirable to provide a black body assembly which can permit quick and easy calibration of the infrared camera without the need to move the camera from its mounted position, allowing the camera to stay in the working position during the calibration.

SUMMARY OF THE INVENTION

The present invention provides, in accordance with one embodiment of the present invention, an assembly for use in calibrating an infrared camera. The assembly includes, in an embodiment, a housing sufficiently sized so as to be substantially supported by a lens of the infrared camera when engaging therewith. The assembly may also include a heat emitter positioned within the housing for emitting a set amount of heat necessary for calibration purposes. The heat emitter, in one embodiment, may include a highly emissive coating on its emitting surface to reduce reflection of photons having wavelengths different from the desired wavelength and to provide substantially uniform temperature distribution over the emitting surface. A heating element may also be provided for controlling the amount of heat to be emitted by the heat emitter. The heating element may be a heating only element or a bi-polar heating/cooling element. In accordance with an embodiment, the assembly may include an insulator to provide thermal isolation around the heat emitter to enhance thermal efficiency of the heat emitter. A heat sink may also be provided adjacent the heating element to draw and dissipate heat from the heating element. The assembly may further include an arm hingedly connecting the housing to the camera to provide a reliable and repeatable way to position and move the housing between its engaging position at the front of the lens and a docking position away from the lens and on the camera.

The present invention also provides, in an embodiment, another assembly for use in calibrating an infrared camera. The assembly include, among other things, a housing sufficiently sized so as to be substantially supported by a lens of the infrared camera when engaging therewith. The assembly may also include a heat emitter positioned within the housing for emitting a set amount of heat necessary for calibration purposes. The heat emitter, in one embodiment, may be coated with a highly emissive solution or material on its emitting surface to reduce reflection of photons having wavelengths different from the desired wavelength and to provide substantially uniform temperature distribution over the emitting surface. A heating element may also be provided for controlling the amount of heat to be emitted by the heat emitter. The assembly may further include a lens guide positioned within the housing toward its front end to substantially align the heat emitter to the lens and to securely position the housing on the lens for calibration purposes. The lens guide, in an embodiment, acts to provide, with each successive use, uniformity and repeatability of the distance and position of the heat emitter to the lens.

In another embodiment, the present invention provides a method for calibrating an infrared camera. The method includes providing an assembly having a housing sufficiently sized so as to be substantially supported by a lens of the infrared camera when engaging therewith, a heat emitter positioned within the housing for emitting a set amount of heat necessary for calibration purposes, a heating element for controlling the amount of heat to be emitted by the heat emitter, and an arm hingedly connecting the housing to the camera. Next the arm may be moved so that the assembly is positioned substantially in front of the lens of the camera. The housing may then be engaged with the lens so that the assembly is substantially supported by the lens. Thereafter, the heating element may be activated to a first set temperature so as to set the temperature of the heat emitter thereto. Once the first set temperature has been reached, a first photon count associated with the first set temperature may be determined. The heating element may subsequently be activated to a second set temperature so as to set the temperature of the heat emitter thereto. A second photon count associated with the second set temperature may next be determined. A photon count for a particular temperature may then be extrapolated based on the photon counts for the first and second set temperatures. In one embodiment, the heating element may thereafter be activated to a temperature corresponding to said particular temperature and a third photon count associated with said particular temperature determined. The third photon count may subsequently be compared to the extrapolated photon count to determine whether the infrared camera is calibrated.

In a further embodiment, the present invention provides another method for calibrating an infrared camera. The method includes providing an assembly having a housing sufficiently sized so as to be substantially supported by a lens of the infrared camera when engaging therewith, a heat emitter positioned within the housing for emitting a set amount of heat necessary for calibration purposes, a heating element for controlling the amount of heat to be emitted by the heat emitter, and a lens guide positioned within the housing toward its front end. Next, the assembly may be positioned in front of the lens of the camera. Thereafter, the lens guide in the housing may be engaged with the lens so that the heat emitter is substantially aligned with the lens. The heating element may then be activated to a first set temperature so as to set the temperature of the heat emitter thereto. Once the first set temperature has been reached, a first photon count associated with the first set temperature may be determined. The heating element may subsequently be activated to a second set temperature so as to set the temperature of the heat emitter thereto. A second photon count associated with the second set temperature may next be determined. A photon count for a particular temperature may then be extrapolated based on the photon counts for the first and second set temperatures. In one embodiment, the heating element may thereafter be activated to a temperature corresponding to said particular temperature and a third photon count associated with said particular temperature determined. The third photon count may subsequently be compared to the extrapolated photon count to determine whether the infrared camera is calibrated.

In accordance with another embodiment, still another method for calibrating an infrared camera is provided. The method includes, initially providing a heat emitter having a highly emissive coating for uniformly emitting across its surface a set amount of heat necessary for calibration purposes. Next, a heating element may be coupled to the heat emitter for controlling the amount of heat to be emitted by the heat emitter. Then the heat emitter may be aligned with a lens of the infrared camera. Thereafter, a guide may be positioned between the heat emitter and the lens, so that upon engagement of the heat emitter and guide to the lens, uniformity and repeatability of a distance between the emitter and the lens can occur. The heat emitter and the guide may subsequently be permitted to be substantially supported by the lens upon engagement therewith. In an embodiment, the heating element may then be activated to a first temperature so as to set the temperature of the heat emitter thereto. Once reached, a first photon count associated with the first set temperature may be determined. The heating element may then be activated to a second temperature so as to set the temperature of the heat emitter thereto. A second photon count associated with the second set temperature may next be determined.

DESCRIPTION OF SPECIFIC EMBODIMENTS

The present invention, in one embodiment, is directed to a camera mountable black body assembly for use in connection with an infrared camera. The black body assembly may be used, among other things, to calibrate infrared detectors or similar devices that may require temperature calibration. In addition, when not in use, the relatively small size of the black body assembly allows it to be employed as a lens cap, providing protection to the camera lens.

Figure 1A:
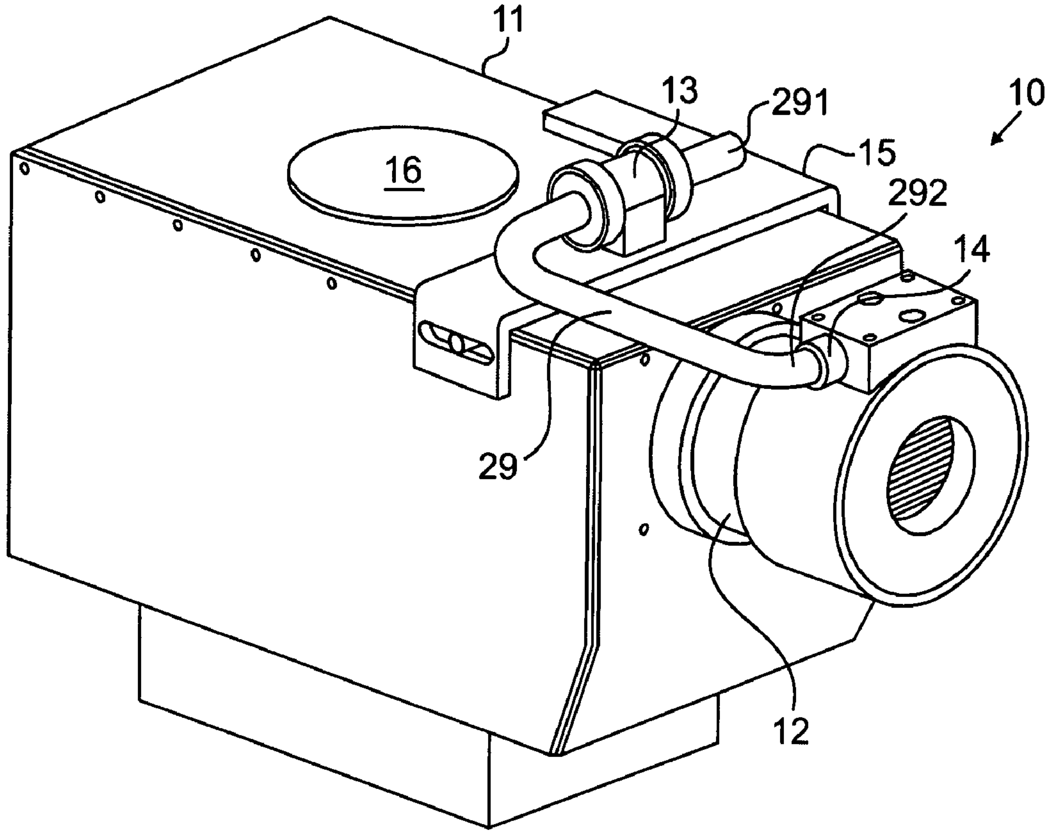
FIG. 1A illustrates a black body assembly, in accordance with one embodiment of the present invention, mounted on an infrared camera in position when being used for calibration.
Figure 1B:
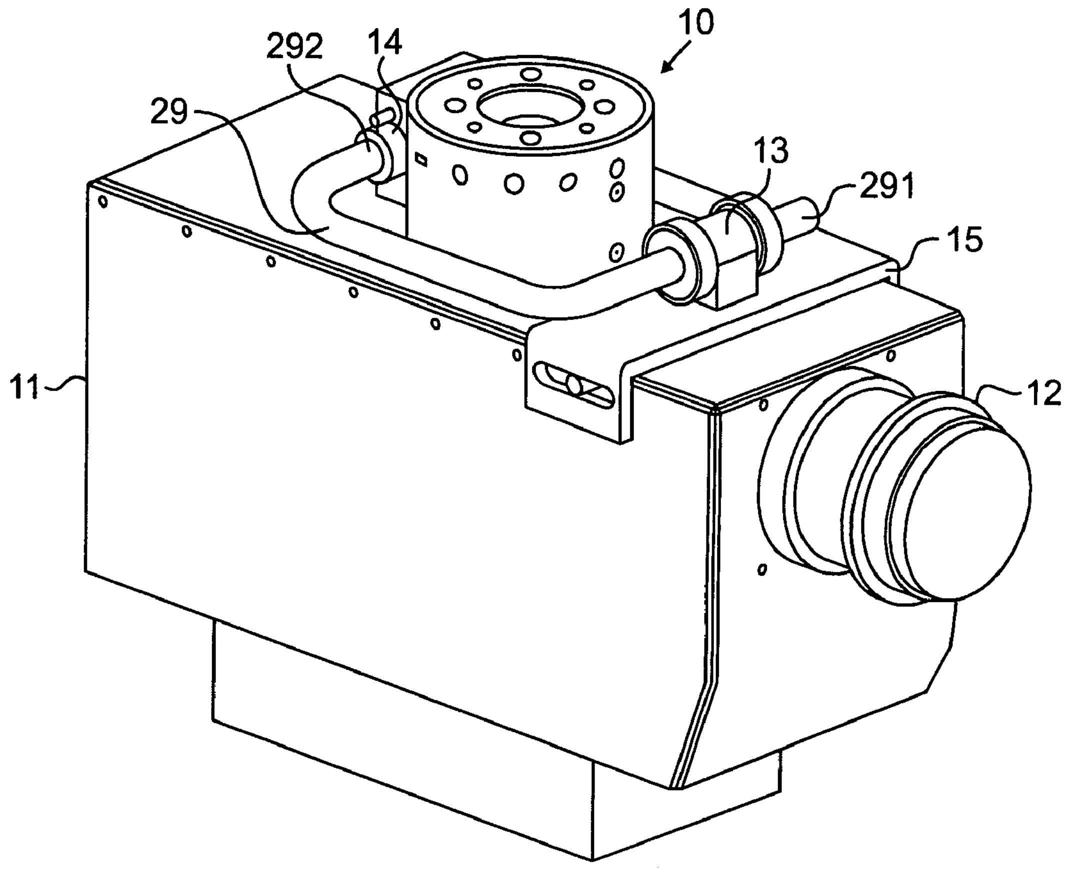
FIG. 1B illustrates the black body assembly in FIG. 1A in a docked position when not in use.

With reference now to FIGS. 1A-B, there is illustrated in FIG. 1A, in accordance with one embodiment of the present invention, a black body assembly 10 hingedly mounted on an infrared camera 11 in an engaging position for calibration purposes. In the engaging position, the black body assembly 10, while circumferentially engaging lens 12 of the camera 11, may be substantially supported by the lens thereon. FIG. 1B, on the other hand, illustrates the black body assembly 10 in a docking position on top of the camera 11, when the assembly 10 is not being used for calibration. It should be noted that assembly 10, due to its small size relative to the camera 11 and lens 12, may remain over the lens 12, as illustrated in FIG. 1A, when not in use to act as a cap for lens 12.

Figure 2:
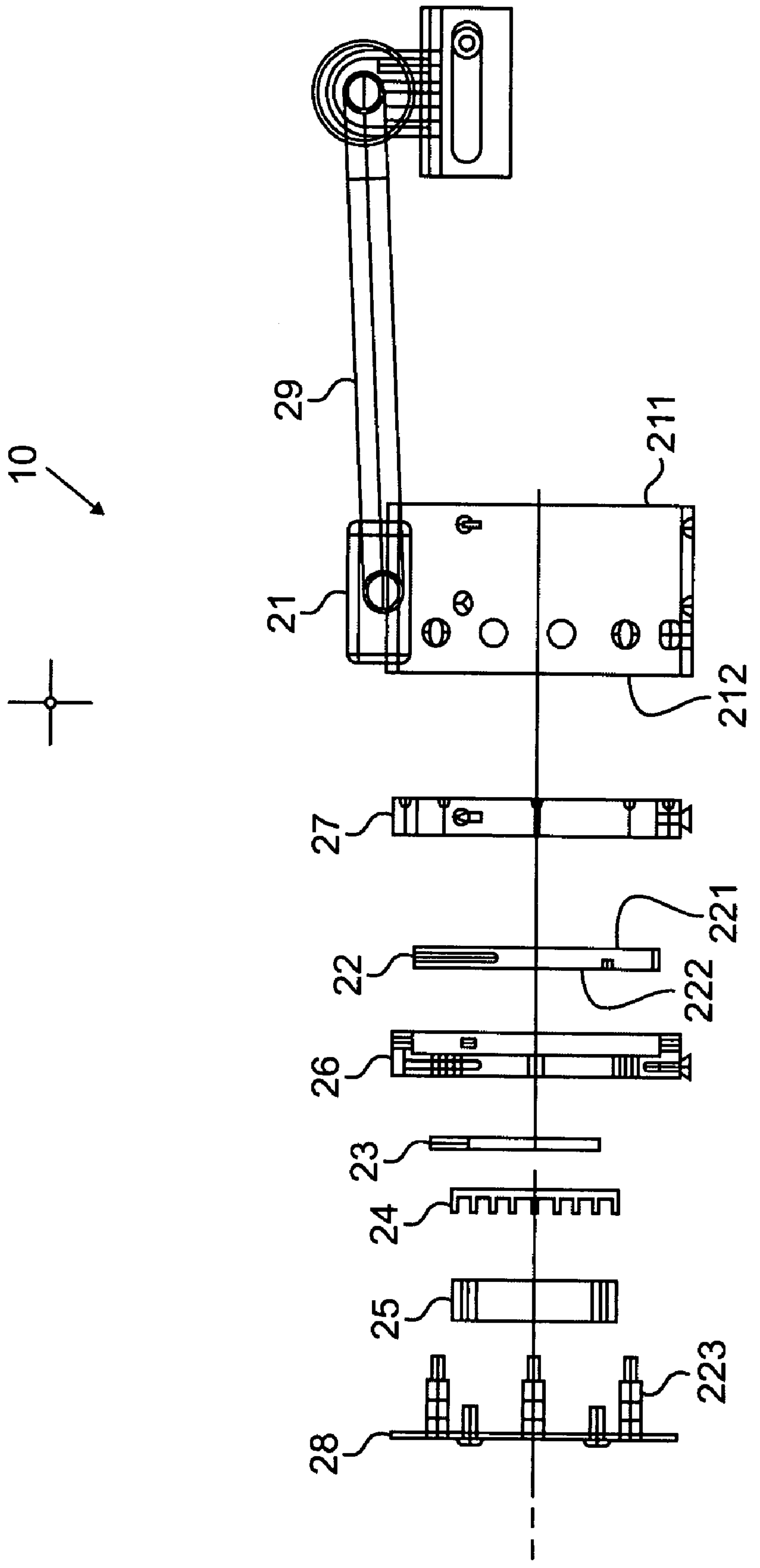
FIG. 2 illustrates an exploded view of a black body assembly in accordance with one embodiment of the present invention.

Looking now at FIG. 2, there is illustrated an exploded view of the black body assembly 10 shown in FIGS. 1A-B. The black body assembly 10, in one embodiment, may include a housing 21 within which components of the black body assembly 10 may be situated. As illustrated, the housing 21 may include a front end 211 and a back end 212, and may be circular in shape to complement the shape of lens 12. Although circular in shape, it should be appreciated that housing 21 may be designed to have any other geometric shapes, so long as the black body assembly 10 can engage lens 12 for calibration purposes. Furthermore, as the housing 21 is designed to accommodate and protect various sensitive calibration components, housing 21 may be made from a strong solid material, such as metal. Of course, any other strong solid materials, for example, molded plastics, may be used.

The black body assembly 10 may also include a heat emitter 22, positioned within the housing 21, for emitting a desired temperature needed for infrared detector and absolute temperature calibration. In one embodiment, the heat emitter 22 may be made from copper, aluminum, or any similar metals or materials that can emit heat. The heat emitter 22 may be designed to include an emitting surface 221, i.e., one that faces the lens 12, and an opposite surface 222. In one embodiment of the invention, the emitting surface 221 may be include a highly emissive coating to reduce the reflection of photons not of the specific wavelength set to detect by the infrared detector. In other words, the highly emissive coating allows those photons having wavelengths corresponding to the set wavelength to be reflected from the heat emitter 22, while absorbing the photons having wavelengths that are different from the set wavelength. The highly emissive coating can also act to provide substantially uniform temperature distribution over the emitting surface 221 for calibration purposes. Such a highly emissive coating may be available from Aremco Products in Valley Cottage, N.Y. or from Aktar Ltd. in Kiryat-Gat, Israel.

In certain instances, it may be desirable or necessary to monitor the temperature of the heat emitter 22, so as to ensure that the temperature emitted is sufficiently correct. To that end, the heat emitter 22 may be designed to include a resistance thermometer or thermistor, or any other thermal sensors (not shown) capable of measuring temperature. The thermistor, in one embodiment, may be a platinum thermistor and may be imbedded within the heat emitter 22. Alternatively, the thermistor may be affixed to either surface of the heat emitter 22 or any other location on the heat emitter 22, so long as the temperature of the emitter 22 can be measured.

Still referring to FIG. 2, the black body assembly 10 may further include a heating element 23, positioned adjacent the heat emitter 22, to control the heating of the heat emitter 22. The heating element 23 may be connected to a temperature controller (see item 35 of FIG. 3) which can be used for setting and controlling specific temperatures to be generated by the heating element 23 and subsequently emitted by the heat emitter 22. In an alternate embodiment, the heating element 23 may be a bi-polar element, such as a Peltier device or thermoelectric cooler, which can act to heat and cool the heat emitter 22.

It should be appreciated that, in one embodiment, the output of the thermistor in the heat emitter 22 may be connected back to the temperature controller to substantially complete the temperature regulation loop. The temperature controller may be used to regulate a current sent to the heating element 23 to achieve and maintain the desired temperature level of the heat emitter 22.

To the extent that excessive heat may be generated by the heating element 23 during temperature cycling, a heat sink 24 may be positioned adjacent the heating element 23, in one embodiment, to assist in the removal of the excessive heat generated. For instance, the heat sink 24 may be placed against one surface of the heating element 23 to provide a large surface area onto which heat from the heating element 23 may be redirected. Heat sink 24, in an embodiment, may be made from a metallic material, a metal alloy, or any other materials that can draw and dissipate heat from the heating element 23.

To further assist in the removal of heat should the heat dissipating ability of the heat sink 24 be inadequate, the black body assembly 10, in one embodiment, may be equipped with a fan 25 near the heat sink 24 to redirect the heat from the heating element 23 and provide an additional means of cooling. As illustrated in FIG. 2, fan 25 may be situated towards the back end 212 of the housing 21, but, of course can be situated in any other convenient location within the housing 21.

The black body assembly 10 may additionally include, in one embodiment, an insulator 26. Insulator 26 may be used, for instance, to provide thermal isolation around the heat emitter 22 to enhance thermal efficiency. For example, in the case where the housing 21 may be made from a material, such as metal, that can draw heat away from the heat emitter 22, by employing insulator 26, stable and substantially precise temperature settings, as well as substantially uniform temperature distribution over the emitting surface 221 of the emitter 22 may be enhanced. Insulator 26 may also act to isolate the heat emitter 22 from, for instance, the heat sink 24 to further enhance thermal efficiency, especially at relatively lower temperature when a heat sink may act to draw needed heat from the emitter 22.

To ensure that the lens 12 of camera 11 can be substantially accurately aligned with the heat emitter 22 for calibration purposes, the black body assembly 10 may include a lens guide 27 located toward the front end 211 of the housing 21. In one embodiment of the present invention, lens guide 27 may be provided with a coupling element (not shown), for instance, a magnet or a plurality of magnets imbedded within or situated on the guide 27. In addition, a metallic body, such as a metal ring (not shown) may be situated around the lens 12 to which the magnets in lens guide 27 may couple, for securely positioning the black body assembly 10 to the lens 12, when the assembly 10 is being used for calibration or as a lens cap. Other coupling elements or mechanisms may also be employed, so long as they are capable of securely positioning the assembly 10 to the lens 12. The use of the lens guide 27 and coupling element, in one embodiment, can also help to ensure that, with each successive use, uniformity and repeatability of the distance and position of the heat emitter 22 to the lens 12 can be achieved. In addition, lens guide 27 along with housing 21 may act to protect and minimize the presence of stray infrared photons within the assembly 10 from external sources, for instance, external lighting to enhance accuracy of the calibration.

The black body assembly 10 may further include a plate 28 removably positioned over the back end 212 of housing 21. In this manner, the plate 28 may act as a cover to maintain the various components of the black body assembly 10 within the housing 21. The presence of the plate 28 may also protect the components of the black body assembly 10 from user interference. The plate 28, in one embodiment, may be secured to the back end 212 of housing 21 by, for instance, a plurality of screws 223. Alternatively, the plate 28 and housing 21 may be provided with complementary threading to permit the back plate 22 to be secured to housing 21. Of course, any other means known in the art for securing the back plate 22 to the housing 21 may also be used.

In order to move the black body assembly 10 between its engaging position over the lens 12 (FIG. 1A) and the docking position (FIG. 1B), arm 29 may be provided to permit the black body assembly 10 to be hingedly connected to the camera 11. As illustrated in FIGS. 1A and B, arm 29 may be connected at one end 291 to a first point of pivot at hinge 13 that is located on camera 11. Hinge 13, in an embodiment, may be designed so that arm 29 pivots within hinge 13 to move along a substantially semicircular path. In addition, arm 29 may be connected at an opposite end 292 to a second point of pivot at hinge 14 that is located on the black body assembly 10. Hinge 14, in one embodiment, may be designed so that the black body assembly 10 pivots or rotates about end 292 of arm 29. In this manner, the black body assembly 10 may rotate from its position substantially about end 292 when the assembly 10 is engaging the lens 12 (FIG. 1A) to a position substantially between ends 291 and 292 when the assembly 10 is in the docking position (FIG. 1B).

In one embodiment, hinge 13 may be secured to a sliding bracket 15 on the camera 11. The sliding bracket 15 may be slid between a forward position and a backward position relative to the lens 12 of camera 11. By providing a sliding bracket 15, the black body assembly 10, once situated in front of the lens 12, may be slid into place toward lens 12, by sliding the bracket 15 backwards away from lens 12, to securely engage the lens. To disengage from the lens 12, the sliding bracket 15 may be slid forward to move the black body assembly 10 from the lens 12.

The arm 29 of the present invention can provide, in an embodiment, an easy way to manipulate the black body assembly 10, as well as a reliable and repeatable way to position the black body assembly 10 at the front of the lens 12. The arm 29 may further act as a conduit within which power supply wires may be located. The wires located within arm 29 may be used to power various components positioned within the black body assembly 10.

It should be noted that although the present invention discloses arm 29 in connection with the black body assembly 10, the black body assembly 10 may be employed without the presence of arm 29. In particular, the black body assembly 10 may be placed in the engaging position over lens 12 simply by manually placing the black body assembly 10 in front of lens 12 and permitting the coupling element, e.g., the plurality of magnets in lens guide 27 to engage the metallic member on lens 12. The lens guide 27, in this embodiment, along with the coupling element can act to ensure that, with each successive use, repeatability of the distance and position of the heat emitter 22 to the lens 12 can be achieved. The black body assembly 10 may subsequently be pulled away from the lens 12 and placed in the docking position when calibration is completed.

Still referring to FIGS. 1A and B, a docking platform 16 may be provided for the black body assembly 10, in accordance with one embodiment of the present invention, adjacent the sliding bracket 15. Accordingly, when in the docking position atop of camera 11, the black body assembly 10 may be placed over the docking platform 16, so that the lens guide 27 situated at the front end 211 of housing 21 may engage therewith and securely hold the black body assembly 10 in place by the magnets on the lens guide 27. To further ensure the placement of the black body assembly 10 on the platform 16, a recess (not shown) may be provided, in one embodiment, by positioning lens guide 27 slightly within the housing 21, so that in the docking position, docking platform 16 may be substantially accommodated within the recess to minimize movement of the black body assembly 10 atop the camera 11.

Figure 3:
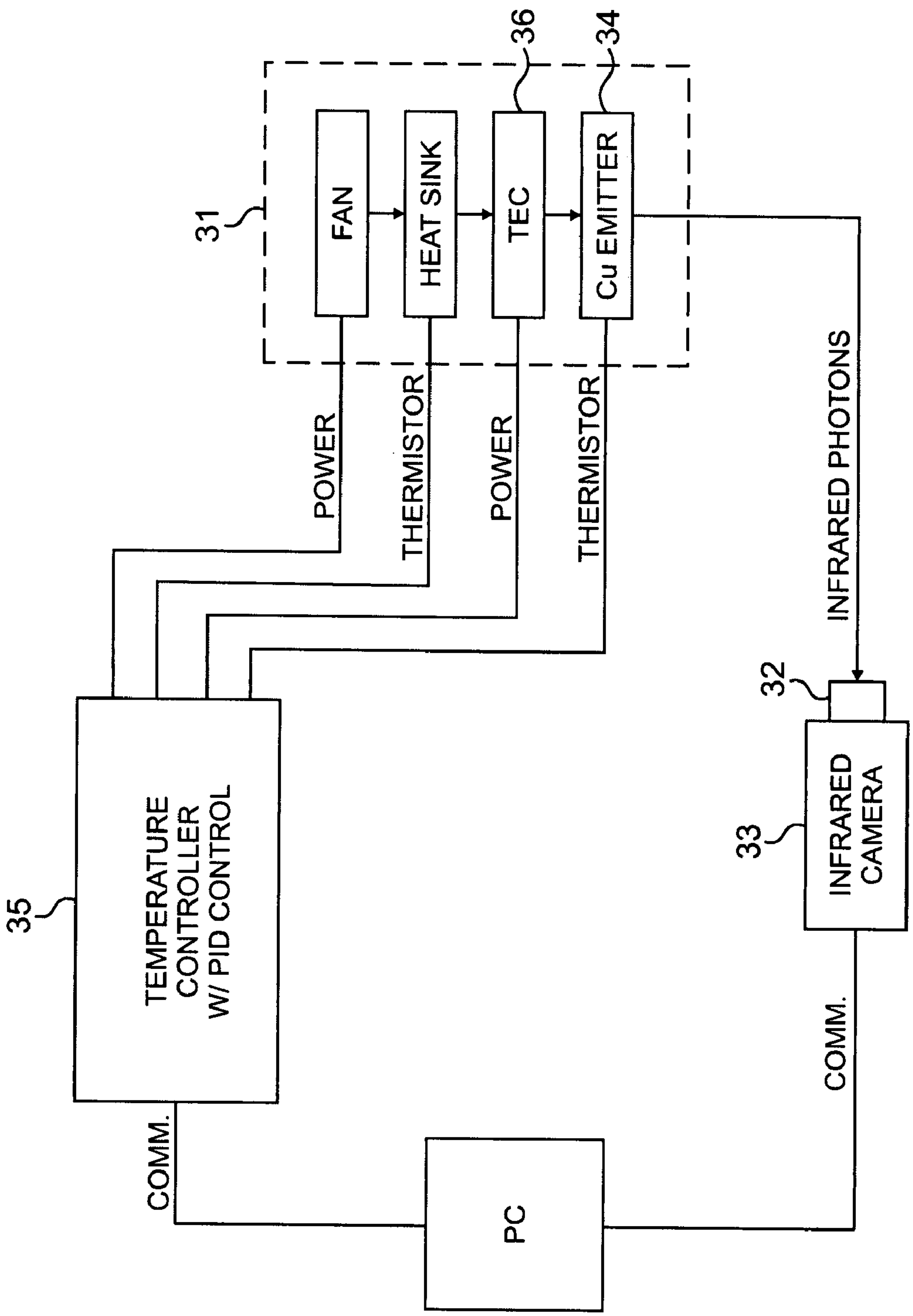
FIG. 3 illustrates a schematic diagram of a calibration protocol in accordance with one embodiment of the present invention.

In operation, referring now to FIG. 3, a black body assembly 31, in one embodiment, may be placed and secured in front of lens 32 of infrared camera 33, for instance, by way of a lens guide, such as that illustrated in FIG. 2. Typically, prior to operation, an infrared camera is calibrated. Calibration often serves to, among other things, (1) establish the working temperature range of the camera for the desired application (i.e. set the temperature range under which the camera will be acting), (2) "teach" the system how to translate a given infrared photon flux reading at the detector into the correct absolute temperature reading, and (3) ensure the uniformity of temperature readings across each pixel of the detector.

There are currently available several methods of infrared detector calibration. At a minimum each involves setting the minimum and maximum temperature that the detector should "see" for the particular application. The magnitude of the photon flux at each of these temperature points can be captured and related to the appropriate temperature level (i.e. "training" the camera system to interpret the level of photon flux at the minimum temperature, and the level of photon flux at the maximum temperature). Subsequent scans then can be interpreted linearly if, for instance, there are two calibration reference points, that is, the minimum and maximum temperatures. Providing additional reference points to the calibration process can help to improve the ability of the system to correctly interpret the temperature using non-linear characteristics according to the black body radiation theory.

In one approach, quantifying a difference between several defined reference temperatures emitted by the heat emitter 34 may be employed in order to calibrate the camera 33 (i.e., the infrared detector in the camera). To quantify the difference, a photon count associated with each reference temperature needs to be determined, as the amount of infrared photons emitted is substantially proportional to the temperature of the heat emitter. For example, in a three point calibration, if a first reference temperature is set at X° C. and a photon count of Y is measured from the emitter 34, and a second reference temperature is set at X+Z° C. and a photon count of 2Y is measured from the emitter 34, one can expect that if the temperature of the emitter 34 is set at X+(Z/2)° C. (i.e., between the two reference temperatures) a photon count of approximately 1.5Y should be measured. If such is the case, then the infrared detector and thus the camera 33 is substantially calibrated. If not, then adjustments to the infrared detector may need to be made prior to using the camera 33. Although a three point calibration approach is disclosed herein, as noted above, there can be other calibration protocols that may be employed in connection with the black body assembly 31 of the present invention.

In accordance with one embodiment of the present invention, the black body assembly 31 may be used to calibrate infrared camera 33 either manually, using an input interface on temperature controller 35, or automatically, using, for instance, a dedicated software application that controls the elements necessary of calibration.

Manual Calibration Procedure

In accordance with one embodiment of the present invention, temperature controller 35 may initially be activated prior to the placement and securing of the black body assembly 31 to the lens 32. Next, the infrared camera 33

(i.e., infrared detector) may be allowed to cool down to an appropriate temperature. Thereafter, a first reference temperature representing, for instance, one extreme (high or low) of a temperature range expected to be measured may be set by way of the temperature controller 35. The first set reference temperature may be, for example, 27° C., but can be any other set temperature, depending on the application. As noted above, the temperature controller 35 acts to power a heating element, such as thermoelectric cooler 36, to subsequently heat the emitter 34 in the black body assembly 31 until the heat emitter 34 reaches the set reference temperature on controller 35. Once the temperature of the heat emitter 34 stabilizes, an image of the emitter 34, and thus the photon count associated with the first reference temperature, may be captured.

A second reference temperature representing the other extreme of the temperature range used above may next be set by way of the temperature controller 35. This second reference temperature may be, for example, 35° C., but again, can be any other set temperature, depending on the application. Once the second reference temperature has been set, the temperature of the heat emitter 34 may be permitted to rise until it stabilizes. An image of the emitter 34, and thus the photon count associated with the second reference temperature may thereafter be acquired. Subsequently, an expected photon count may be extrapolated for a particular temperature based on a curve generated between the two set reference temperatures.

Once the expected photon count been extrapolated, a third reference temperature corresponding to the particular temperature from which the expected photon count has been extrapolated may be set by way of the temperature controller 35. This third reference temperature may be, for example, 31° C. in the case where the first and second reference temperature values are 27° C. and 35° C. respectively, but as noted above, can be any other set temperature along the curve generated by the two set reference temperatures, depending on the application. The temperature of the heat emitter 34 may thereafter be allowed to rise until it stabilizes, and an image of the heat emitter 34, and thus the photon count associated with the third reference temperature may be captured.

The actual photon count for this third reference temperature may then be compared to the extrapolated photon count for the expected particular temperature. If the actual photon count and the extrapolated photon count are substantially similar, then the camera 33 is calibrated. If the photon counts are measurably different, then adjustments to the camera 33 (i.e., infrared detector) need to made and the calibration repeated until the counts are substantially similar.

The calibration procedure may thereafter be terminated, and the black body assembly 31 may be removed from lens 32. The black body assembly 31 may subsequently be placed onto the camera 33 into a docking position, as shown in FIG. 1B, and the camera 33 is ready for use. It should be appreciated that when the camera 33 is no longer in use, the black body assembly 31 may be repositioned over the lens 32 for use as a lens cap, as shown in FIG. 1A.

As noted above, although a three point calibration approach is disclosed herein, it should be appreciated that there are other calibration protocols that may be employed in connection with the black body assembly 31 of the present invention Automatic Calibration Procedure In accordance with another embodiment of the present invention, temperature controller 35 may initially be activated prior to the placement and securing of the black body assembly 31 to the lens 32. Next, the automatic calibration software may be initiated by way of computer 37. In one embodiment of the invention, the software application used in connection with the automatic calibration procedure allows, among other things, for the selection of the camera type and selection of the calibration sequence. The software application may also be used to interface with the camera 33 and the temperature controller 35 to perform the functions in the manual procedure, for instance, setting the temperature on the temperature controller 35 to the required values, executing a sequence of camera specific commands to capture the image, and calculating, extrapolating and comparing the photon counts, among other things, for calibration purposes.

Once the automatic calibration procedure is completed, the black body assembly 31 may be removed from lens 32. The black body assembly 31 may subsequently be placed onto the camera 33 into a docking position, as shown in FIG. 1B, and the camera 33 is ready for use. It should be appreciated that when the camera 33 is no longer in use, the black body assembly 31 may be repositioned over the lens 32 for use as a lens cap, as shown in FIG. 1A, for protection of the lens 32.

Due to its relatively small size and lightness in weight (i.e., slightly bigger than the standard lens cap), the black body assembly 10 of the present invention, while engaging the lens 12, may be supported by the lens thereon. In addition to its ease of use, the black body assembly 10 of the present invention can also eliminate the need to move an infrared camera to the location of a conventional relatively big and bulky black body assembly or vice versa. Moreover, the convenient arm 29 can provide an easy way to manipulate the black body assembly 10, as well as a reliable and repeatable way to position the black body assembly 10 at the front of the infrared lens 12. The lens guide 27, on the other hand, permits, with each successive use, uniformity and repeatability of the distance and position of the heat emitter to the lens for calibration purposes.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. An assembly for use in calibrating an infrared camera, the assembly comprising: a housing having a back end and a front end, and sufficiently sized so as to be substantially supported by a lens of the infrared camera when engaging therewith; a heat emitter positioned within the housing for emitting a set amount of heat necessary for calibration purposes; a heating element for controlling the amount of heat to be emitted by the heat emitter; and an arm hingedly connecting the housing to the camera to provide a reliable and repeatable way to position and move the housing between its engaging position at the front of the lens and a docking position away from the lens and onto the camera.

2. An assembly as set forth in claim 1, wherein the heat emitter includes an emitting surface having a highly emissive coating to enhance the efficiency and accuracy of the calibration.

3. An assembly as set forth in claim 2, wherein the coating also acts to provide substantial uniformity of temperature distribution over the emitting surface, so as to further enhance accuracy of the calibration.

4. An assembly as set forth in claim 1, wherein the heat emitter is made from a metallic material.

5. An assembly as set forth in claim 1, wherein the heating element includes one of a bi-polar heating/cooling element, a Peltier device, or a thermoelectric cooler.

6. An assembly as set forth in claim 1. wherein the arm includes an end connected to a first point of pivot on the camera.

7. An assembly as set forth in claim 6, wherein the first point of pivot permits the arm to move along a substantially semicircular path to permit repeatability of positioning of the housing between the engaging position and the docking position.

8. An assembly as set forth in claim 6, wherein the first point of pivot is coupled to a sliding bracket for sliding between a forward and a backward position relative to the lens of the camera, so as to permit engagement and disengagement of the housing to and from the lens.

9. An assembly as set forth in claim 6, wherein the arm includes an opposite end connected to a second point of pivot on the housing.

10. An assembly as set forth in claim 9, wherein the second point of pivot permits the housing to rotate between its position at one end of the arm to a position between the two ends of the arm.

11. An assembly as set forth in claim 6, wherein the arm acts as a conduit within which power supply wires may be located.

12. An assembly as set forth in claim 1, further including a heat sink adjacent the heating element to draw and dissipate heat from the heating element.

13. An assembly as set forth in claim 1, further including a fan near the heating element to redirect heat away from the heating clement.

14. An assembly as set forth in claim 1, further including an insulator to provide thermal isolation around the heat emitter to enhance thermal efficiency of the heat emitter.

15. An assembly as set forth in claim 14, wherein the insulator acts to enhance a substantially uniform temperature distribution over an emitting surface of the heat emitter.

16. An assembly as set forth in claim 1, further including a lens guide positioned within the housing toward its front end to substantially align the heat emitter to the lens and to securely position the housing on the lens for calibration purposes.

17. An assembly as set forth in claim 16, wherein the lens guide includes at least one magnet positioned thereon to engage a metallic member on the lens.

18. An assembly as set forth in claim 16, wherein the lens guide acts to provide, with each successive use, uniformity and repeatability of the distance and position of the heat emitter to the lens for calibration purposes.

19. An assembly as set forth in claim 1, further including a cover plate positioned over the back end of the housing to maintain components of the assembly within the housing.

20. An assembly for use in calibrating an infrared camera, the assembly comprising: a housing having a back end and a front end, and sufficiently sized so as to be substantially supported by a lens of the infrared camera when engaging therewith; a heat emitter positioned within the housing for emitting a set amount of heat necessary for calibration purposes; a heating element for controlling the amount of heat to be emitted by the heat emitter; and a lens guide positioned within the housing toward its front end to substantially align the heat emitter to the lens and to securely position the housing on the lens for calibration purposes.

21. An assembly as set forth in claim 20, wherein the heat emitter includes an emitting surface having a highly emissive coating to enhance the efficiency and accuracy of the calibration.

22. An assembly as set forth in claim 21, wherein the coating also acts to provide substantial uniformity of temperature distribution over the emitting surface, so as to further enhance accuracy of the calibration.

23. An assembly as set forth in claim 20, wherein the lens guide acts to provide, with each successive use, uniformity and repeatability of the distance and position of the heat emitter to the lens for calibration purposes.

24. An assembly as set forth in claim 20, wherein the arm includes an end connected to a first point of pivot on the camera.

25. An assembly as set forth in claim 24, wherein the first point of pivot permits the arm to move along a substantially semicircular path to permit positioning of the housing between the engaging position and the docking position.

26. An assembly as set forth in claim 24, wherein the arm includes an opposite end connected to a second point of pivot on the housing.

27. An assembly as set forth in claim 26, wherein the second point of pivot permits the housing to rotate between its position at one end of the arm to a position between the two ends of the arm.

28. A method for calibrating an infrared camera, the method comprising:

providing an assembly having a housing sufficiently sized so as to be substantially supported by a lens of the infrared camera when engaging therewith, a heat emitter positioned within the housing for emitting a set amount of heat necessary for calibration purposes, a heating element for controlling the amount of heat to be emitted by the heat emitter, and an arm hingedly connecting the housing to the camera;

moving the arm so that the assembly is positioned substantially in front of the lens of the camera;

allowing the housing to engage the lens so that the assembly is substantially supported by the lens; activating the heating element to a first set temperature so as to set the temperature of the heat emitter thereto;

determining a first photon count associated with the first set temperature from the heat emitter;

activating the heating element to a second set temperature so as to set the temperature of the heat emitter thereto;

determining a second photon count associated with the second set temperature from the heat emitter, comparing the first photon count with the second photon count; and providing an indication as to the calibration of said infrared camera based upon a result of said comparing step.

29. A method as set forth in claim 28, wherein the step of allowing includes providing complementary coupling elements on the housing and the lens to permit the assembly to securely engage the lens.

30. A method as set forth in claim 29, wherein the step of providing further includes permitting uniformity and repeatability of distance and position of the heat emitter to the lens.

31. A method as set forth in claim 28, further including: extrapolating a photon count for a particular temperature based on the photon counts for the first and second set temperatures; activating the heating element to a temperature corresponding to the particular temperature; determining a third photon count associated with the particular temperature; and comparing the third photon count to the extrapolated photon count.

32. A method for calibrating an infrared camera, the method comprising:

providing an assembly having a housing sufficiently sized so as to be substantially supported by a lens of the infrared camera when engaging therewith, a heat emitter positioned within the housing for emitting a set amount of heat necessary for calibration purposes, a heating element for controlling the amount of heat to be emitted by the heat emitter, and a lens guide positioned within the housing toward its front end;

positioning the assembly substantially in front of the lens of the camera;

engaging the lens guide with the lens so that the heat emitter is substantially aligned with the lens;

allowing the assembly to be substantially supported by and securely engaged to the lens;

activating the heating element to a first set temperature so as to set the temperature of the heat emitter thereto;

determining a first photon count associated with the first set temperature from the heat emitter;

activating the heating element to a second set temperature so as to set the temperature of the heat emitter thereto;

determining a second photon count associated with the second set temperature from the heat emitter;

comparing the first photon count with the second photon count; and providing an indication as to the calibration of said infrared camera based upon a result of said comparing step.

33. A method as set forth in claim 32, wherein the step of allowing includes providing complementary coupling elements on the lens guide and the lens to permit the assembly to securely engage the lens.

34. A method as set forth in claim 33, wherein the step of providing further includes permitting uniformity and repeatability of distance and position of the heat emitter to the lens.

35. A method as set forth in claim 32, further including: extrapolating a photon count for a particular temperature based on the photon counts for the first and second set temperatures; activating the heating element to a temperature corresponding to the particular temperature; determining a third photon count associated with the particular temperature; and comparing the third photon count to the extrapolated photon count.

36. A method for calibrating an infrared camera, the method comprising: providing a heat emitter having a highly emissive coating for uniformly emitting across its surface a set amount of heat necessary for calibration purposes; coupling a heating element to the heat emitter for controlling the amount of heat to be emitted by the heat emitter; aligning the heat emitter with a lens of the infrared camera; positioning a guide between the heat emitter and the lens, so that upon engagement of the heat emitter and guide to the lens, uniformity and repeatability of a distance between the emitter and the lens can occur; and allowing the heat emitter and the guide to be substantially supported by the lens upon engagement therewith.

37. A method as set forth in claim 36, further including: activating the heating element to a first temperature so as to set the temperature of the heat emitter thereto; determining a first photon count associated with the first set temperature from the heat emitter; activating the heating element to a second temperature so as to set the temperature of the heat emitter thereto; and determining a second photon count associated with the second set temperature from the heat emitter.

38. A method as set forth in claim 36, wherein the step of aligning includes associating the heat emitter with an arm hingedly connected to the camera, so as to reliably manipulate repeated alignment of the heat emitter to the lens.

* * * * *